(12) United States Patent
Yoneda et al.

(10) Patent No.: US 10,567,924 B2
(45) Date of Patent: *Feb. 18, 2020

(54) COMMUNICATION METHOD, WIRELESS BASE STATION, SERVER, AND WIRELESS DISTRIBUTION SYSTEM

(71) Applicant: Panasonic Intellectual Property Corporation of America, Torrance, CA (US)

(72) Inventors: Takahiro Yoneda, Osaka (JP); Kazunobu Konishi, Osaka (JP); Yuta Shimotsuma, Osaka (JP); Ryota Ohnishi, Hyogo (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/694,362

(22) Filed: Sep. 1, 2017

(65) Prior Publication Data

US 2018/0077539 A1  Mar. 15, 2018

(30) Foreign Application Priority Data

Sep. 9, 2016 (JP) ................................. 2016-177111
Apr. 28, 2017 (JP) ................................. 2017-090606

(51) Int. Cl.
*H04W 4/06* (2009.01)
*H04L 12/18* (2006.01)
*H04W 28/02* (2009.01)

(52) U.S. Cl.
CPC .......... *H04W 4/06* (2013.01); *H04L 12/1895* (2013.01); *H04W 28/0205* (2013.01);
(Continued)

(58) Field of Classification Search
CPC ................ H04W 28/0205; H04W 4/06; H04L 12/1863; H04L 12/1868; H04L 12/189; H04L 12/1895
See application file for complete search history.

(56) References Cited

U.S. PATENT DOCUMENTS 7,506,043 B2 * 3/2009 Ali ........................ H04W 28/16
370/230
8,090,867 B2 * 1/2012 Katis ....................... H04L 51/04
370/468
(Continued)

FOREIGN PATENT DOCUMENTS

JP 2007-329612 12/2007
JP 2007-329614 12/2007
(Continued)

OTHER PUBLICATIONS

The Extended European Search Report dated Feb. 6, 2018 for European Patent Application No. 17188704.5.

*Primary Examiner* — Steven H Nguyen
(74) *Attorney, Agent, or Firm* — Greenblum & Bernstein, P.L.C.

(57) ABSTRACT

A communication method includes generating a packet including the data regarding which the priority has been set beforehand, acquiring channel-used time, calculating channel-usable time based on the channel-used time, calculating a first channel usage estimated time, calculating a wireless transmission rate to be applied when the wireless base station transmits the packet to the first wireless terminal and the second wireless terminal, based on the priority of the data included in the packet, to where the first channel usage estimated time is within the channel-usable time, and transmitting the packet, and information indicating the wireless transmission rate, to the wireless base station.

9 Claims, 9 Drawing Sheets

(52) U.S. Cl.
    CPC ........ *H04L 12/189* (2013.01); *H04L 12/1863* (2013.01); *H04L 12/1868* (2013.01)

(56) References Cited

U.S. PATENT DOCUMENTS

| | | | |
|---|---|---|---|
| 9,287,925 B2* | 3/2016 | Wilczewski | H04B 1/715 |
| 9,515,941 B2* | 12/2016 | Howes | H04L 47/22 |
| 2003/0142658 A1* | 7/2003 | Ofuji | H04W 72/10 |
| | | | 370/349 |
| 2004/0078460 A1* | 4/2004 | Valavi | H04L 41/0896 |
| | | | 709/224 |
| 2011/0044227 A1* | 2/2011 | Harrang | H04H 20/42 |
| | | | 370/312 |
| 2012/0314595 A1 | 12/2012 | Oikawa | |
| 2012/0324124 A1* | 12/2012 | Locker | H04W 72/0486 |
| | | | 709/233 |
| 2013/0208708 A1* | 8/2013 | Nezou | H04W 74/08 |
| | | | 370/336 |
| 2014/0146676 A1* | 5/2014 | Howes | H04L 47/2441 |
| | | | 370/235 |
| 2015/0023181 A1 | 1/2015 | Shao et al. | |
| 2015/0055458 A1 | 2/2015 | Wakuda et al. | |

FOREIGN PATENT DOCUMENTS

| | | |
|---|---|---|
| JP | 2007-329614 A | 12/2007 |
| JP | 2013-004994 | 1/2013 |
| JP | 2015-142345 | 8/2015 |
| WO | 2013/125375 | 8/2013 |

\* cited by examiner

WIRELESS TRANSMISSION RATE CONTROL MANAGEMENT TABLE

| 301 PRIORITY | 302 CONTROL OBJECT | 303 TRANSMISSION OBJECT | 304 WIRELESS TRANSMISSION RATE |
|---|---|---|---|
| HIGH | false | true | OFDM6Mbps |
| MEDIUM | true | true | OFDM12Mbps |
| LOW | true | true | OFDM24Mbps |

COMMUNICATION METHOD, WIRELESS BASE STATION, SERVER, AND WIRELESS DISTRIBUTION SYSTEM

BACKGROUND

1. Technical Field

The present disclosure relates to a communication method, a wireless base station, a server, and a wireless distribution system.

2. Description of the Related Art

Examples of communication methods used on a wireless network configured according to wireless local area network (LAN) stipulated in IEEE 802.11 include unicast, multicast, and broadcast. Unicast is a communication method where packets are exchanged on a one-to-one basis between a particular wireless base station and a particular wireless terminal, between two particular wireless terminals, or the like. Multicast is a communication method where at least one or more groups (hereinafter referred to as "multicast group") is formed, and packets are transmitted from a wireless base station or wireless terminal participating in a multicast group to other wireless base stations or wireless terminals participating in the same multicast group. This communication method is used in cases where communication is performed by Internet Protocol (IP) multicast, for example. Broadcast is a communication method of transmitting packets without specifying a destination. This communication method is used when transmitting advertisement beacon frames from a wireless base station to wireless terminals, for example.

Note that reception confirmation by acknowledgement (Ack) frame is not performed in response to transmission of a frame over the wireless LAN, in the communication methods by multicast and broadcast described above. Accordingly, even if a frame transmission error occurs, frame retransmission over the wireless LAN is not performed automatically.

Next, a transmission method of packets by IP multicast (hereinafter referred to as "multicast packet") will be described. Communication is performed in IP multicast using an IP address for identifying a multicast group, called a multicast IP address (see Japanese Patent No. 4386292 and Japanese Unexamined Patent Application Publication No. 2007-329614, for example). Specifically, when a server transmits a multicast packet addressed to a multicast group, a multicast IP address corresponding to this multicast group is specified as the target address of the multicast packet.

On the other hand, when a wireless terminal (client) has received a multicast packet transmitted addressed to a multicast group, the multicast packet addressed to the multicast IP address corresponding to that multicast group is received. Accordingly, the wireless terminal declares to the wireless base station on the IP network connected to itself that it will receive the packet addressed to the multicast IP address, by notification of the multicast IP address using a join message according to the Internet Group Management Protocol (IGMP) in the case of IPv4, for example.

When the wireless base station receives the join message, a distribution tree is configured between the wireless base station and router on the IP network such that multicast packets addressed to the multicast IP address will be transferred to the wireless terminal. Accordingly, the wireless base station and router on the IP network transfer multicast packets to the wireless terminal based on the distribution tree that has been configured.

However, there is concern regarding the conventional communication method by multicast that multicast packets may not be able to be transmitted in real-time on the wireless network.

SUMMARY

One non-limiting and exemplary embodiment provides a communication method, wireless base station, server, and wireless distribution system, that can transmit multicast packets in real-time on a wireless network.

In one general aspect, the techniques disclosed here feature a communication method of a server that transmits a packet by multicast or broadcast via a wireless base station to at least one or more wireless terminals connected to the wireless base station via a wireless network using a channel. The method includes: generating the packet including the data regarding which the priority has been set beforehand; acquiring channel-used time that is time over which the channel is used per unit time at the wireless base station; calculating channel-usable time that is time over which the channel can be used per unit time, for the wireless base station to transmit the packet to the wireless terminal, based on the channel-used time; calculating a first channel usage estimated time that is time estimated to be used for the wireless base station to use the channel to transmit the packet to the wireless terminal; calculating a wireless transmission rate to be applied when the wireless base station transmits the packet to the wireless terminal, based on the priority of the data included in the packet, to where the first channel usage estimated time is within the channel-usable time; and transmitting the packet, and information indicating the wireless transmission rate, to the wireless base station.

In a communication method according to an aspect of the present disclosure, when transmitting data by multicast or broadcast on a wireless network, data can be transmitted in real-time by adaptively controlling wireless transmission rates based on priority of data.

It should be noted that general or specific embodiments may be implemented as a system, a method, an integrated circuit, a computer program, a storage medium such as a computer-readable Compact Disc Read-Only Memory (CD-ROM), or any selective combination of the system, method, integrated circuit, computer program, and storage medium.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4 is a diagram illustrating an example of a wireless transmission rate control management table;

DETAILED DESCRIPTION

Figure 1:
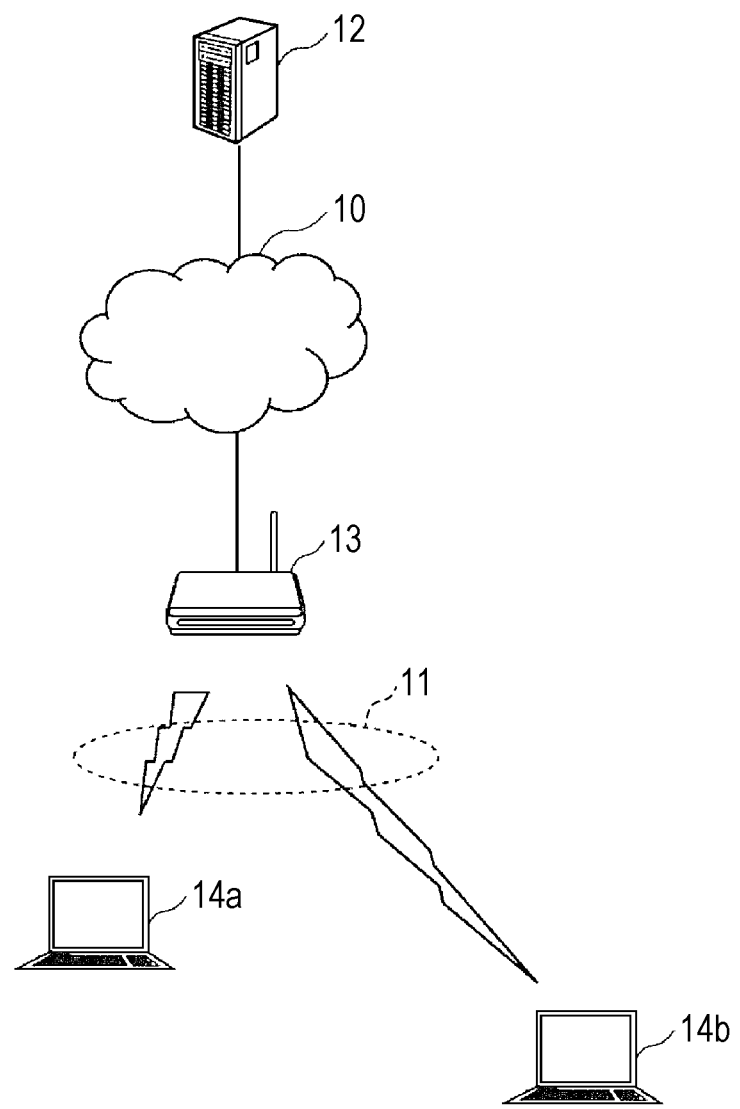
FIG. 1 is a diagram illustrating the configuration of a wireless distribution system according to an embodiment.

Underlying Knowledge Forming Basis of the Present Disclosure

The present inventors have found that the following problems occur with regard to the technology described in the Related Art. First, access control in a wireless LAN will be described. Autonomous decentralized control called distributed coordination function (DCF) is performed in a wireless LAN based on Carrier Sense Multiple Access/Collision Avoidance (CSMA/CA), using a wireless frequency (hereinafter referred to as "channel") that has been selected beforehand. Access control using DCF in a wireless distribution system will be described below.

A wireless distribution system has a server, a wireless base station, a first wireless terminal, and a second wireless terminal. The server is connected to the wireless base station via a cabled network. The wireless base station configures a wireless network using a channel. The first wireless terminal and second wireless terminal, which are clients, are connected to the wireless base station via the wireless network.

In a case of transmitting a packet to the server, the first wireless terminal uses a channel to transmit a frame including the packet to the wireless base station. While the first wireless terminal is transmitting the frame using this channel at this time, the wireless base station and second wireless terminal cannot transmit frames, in order to prevent channel interference from occurring on the wireless network. In a case where another wireless network using the same channel as this channel is also reached by radio waves transmitted by the first wireless terminal, the wireless base station and wireless terminals making up this other wireless network are not able to transmit frames either, as long as the first wireless terminal is transmitting the frame using this channel.

Now, wireless transmission rate in a wireless LAN will be described. A wireless transmission rate is selected from multiple wireless transmission rates to transmit frames in a wireless LAN. For example, the IEEE 802.11a standard enables a wireless transmission rate to be selected from the eight wireless transmission rates of 6, 9, 13, 18, 24, 36, 48, and 54 Mbps.

Generally, the lower the wireless transmission rate is, the fewer errors occur on the wireless network, and the frame can be made to reach farther away. This improves reliability regarding frame transmission. On the other hand, the higher the wireless transmission rate is, the more information can be transmitted in a short time. Accordingly, when transmitting frames of the same length, the higher the wireless transmission rate is, the shorter the time using the channel can be made.

Next, the wireless transmission rate in a case of transmitting a frame on a wireless network by multicast in the above-described wireless distribution system will be described. When the server has transmitted a frame by multicast to the first wireless terminal and second wireless terminal using IP multicast, the wireless base station transmits the frame received from the server to the first wireless terminal and second wireless terminal via the wireless network. Generally, in a case where the distance between the wireless base station and the second wireless terminal is longer than the distance between the wireless base station and the first wireless terminal, the attenuation of radio waves reaching the second wireless terminal from the wireless base station is greater than the attenuation of radio waves reaching the first wireless terminal from the wireless base station.

As described above, in a case of transmitting a frame by multicast on a wireless network, retransmission of the frame is not automatically performed in a case where a frame transmission error occurs. Accordingly, the slowest wireless transmission rate is selected to broaden the frame arrival range, in order to secure frame transmission reliability with regard to multiple wireless terminals in different radio wave reception states. However, transmitting high-bitrate data in real-time becomes difficult if the selected wireless transmission rate is slow.

The method disclosed in Japanese Patent No. 4386292 addresses this issue when a wireless base station transmits a frame by multicast to multiple wireless terminals, by performing prior registration of the multicast IP address to be used and bitrate information of data included in the frame to be transmitted from the server to that multicast IP address. Upon having received a frame addressed to the registered multicast IP address from the server, the wireless base station transmits the frame by multicast to multiple wireless terminals using the wireless transmission rate suitable for the bitrate of data included in this frame. The multiple terminal devices each select a bit rate for data to be received, in accordance with the radio wave reception state between itself and the wireless base station, and transmit an IGMP join message including a multicast IP address corresponding to this data. Accordingly, each of the multiple wireless terminals can receive data in real-time at a bitrate suited to the radio wave reception state, while maintaining reliability of frame transmission.

However, the method disclosed in Japanese Patent No. 4386292 does not take into consideration the occurrence of channel interference. For example, when a wireless terminal starts transmitting a frame, the wireless base station cannot perform frame transmission at all. Accordingly, frames in transmission standby are accumulated at the wireless base station while the wireless terminal is transmitting a frame. This makes transmission of data in real-time difficult for the server.

In the method disclosed in Japanese Unexamined Patent Application Publication No. 2007-329614, when transmitting a frame by multicast, the wireless base station selects, based on time where a channel is not being used (hereinafter referred to as "channel-unused time") and the bitrate of data transmitted to the multicast IP address, an optimal wireless transmission rate suitable for transmission of a frame to this multicast IP address. Specifically, the wireless base station calculates the channel-unused time per unit time. Further, the wireless base station selects the wireless transmission rate based on the bitrate of data transmitted from the server to the multicast IP address, such that time of using a channel in a case of having selected a wireless transmission rate for transmission of the frame is within the channel-unused time.

However, the method disclosed in Japanese Unexamined Patent Application Publication No. 2007-329614 does not take into consideration cases where the channel-unused time is extremely short. Specifically, when the time of using a channel in a case where the fastest wireless transmission rate has been selected for frame transmission exceeds the channel-unused time, frames in transmission standby are accumulated at the wireless base station. This makes transmission of data in real-time difficult for the server.

A communication method according to an aspect of the present disclosure is a communication method of a server that transmits a packet by multicast or broadcast via a wireless base station to at least one or more wireless terminals connected to the wireless base station via a wireless network using a channel. The method includes: generating the packet including the data regarding which the priority has been set beforehand; acquiring channel-used time that is time over which the channel is used per unit time at the wireless base station; calculating channel-usable time that is time over which the channel can be used per unit time, for the wireless base station to transmit the packet to the wireless terminal, based on the channel-used time; calculating a first channel usage estimated time that is time estimated to be used for the wireless base station to transmit the packet to the wireless terminal; calculating a wireless transmission rate to be applied when the wireless base station transmits the packet to the wireless terminal, based on the priority of the data included in the packet, to where the first channel usage estimated time is within the channel-usable time; and transmitting the packet, and information indicating the wireless transmission rate, to the wireless base station.

According to this aspect, the server controls the wireless transmission rate based on the priority of the data included in the packet, so that the first channel usage estimated time is within the channel-usable time. For example, in a case where the channel-usable time is relatively short, a faster wireless transmission rate is used when the wireless base station transmits a packet including data with low priority on the wireless network, whereby the first channel usage estimated time can be reduced, and data can be transmitted in real-time. On the other hand, in a case where the channel-usable time is relatively long, a slower wireless transmission rate is used when the wireless base station transmits a packet including data with high priority on the wireless network, whereby the reliability of data transmission can be improved. The server also decides priority of data based on information relating to the wireless terminal, so data suited to the wireless terminal can be transmitted with priority.

The communication method may further include setting an initial value for the wireless transmission rate. In the calculating of the wireless transmission rate, the initial value of the wireless transmission rate may be changed based on the priority of the data included in a particular packet, in a case where the first channel usage estimated time exceeds the channel-usable time.

According to this configuration, in a case where the first channel usage estimated time exceeds the channel-usable time, the initial value of the wireless transmission rate is changed based on the priority of data. For example, the first channel usage estimated time can be brought within the channel-usable time by changing the initial value of the wireless transmission rate corresponding to data with low priority to a higher value, and data transmission can be performed in real-time.

In the generating, a plurality of the packets each including a plurality of data of which the priority differs from each other may be generated. In the calculating of the first channel usage estimated time, the first channel usage estimated time may be calculated that is estimated time of the wireless base station using the channel to transmit the plurality of packets to the wireless terminal. In the calculating of the wireless transmission rate, in a case where the first channel usage estimated time exceeds the channel-usable time, the particular packet including the data of which the priority may be lowest is extracted from the plurality of packets, and the initial value for the wireless transmission rate corresponding to the particular packet may be changed to a higher value.

According to this configuration, in a case where the first channel usage estimated time exceeds the channel-usable time, the initial value of the wireless transmission rate corresponding to the particular packet including data with the lowest priority is changed to a higher value. Accordingly, the first channel usage estimated time can be brought within the channel-usable time, and data can be transmitted in real-time.

The communication method may further include: calculating, after changing the wireless transmission rate in the calculating of the wireless transmission rate, a second channel usage estimated time that is estimated time of the wireless base station using the channel to transmit the plurality of packets including the particular packet to the wireless terminal; and determining whether or not to transmit the particular packet to the wireless base station in a case where the second channel usage estimated time exceeds the channel-usable time.

According to this configuration, in a case where the second channel usage estimated time exceeds the channel-usable time, determination can be made regarding whether or not to transmit the particular packet to the wireless base station. For example, in a case where the channel-usable time is extremely short, the server can transmit data with high priority in real-time, by not transmitting the particular packet including data with the lowest priority to the wireless base station.

The communication method may further include discarding the particular packet in a case of having determined not to transmit the particular packet to the wireless base station in the determining.

According to this configuration, the particular packet can be suppressed from being accumulated at the wireless base station, by discarding the particular packet.

In the transmitting, an identifier indicating the wireless transmission rate may be imparted to the packet.

According to this configuration, information indicating the wireless transmission rate can be transmitted to the wireless base station by a simple method.

A wireless base station according to an aspect of the present disclosure is a wireless base station connected to a server via a network, and connected to at least one or more wireless terminals via a wireless network using a channel. The wireless base station includes: a receiver that receives a packet from the server; a decider that decides a wireless transmission rate to be applied when transmitting the received packet to the wireless terminal; a transmitter that transmits the packet by multicast or broadcast to the wireless terminal at the wireless transmission rate; and a measurer that measures channel-used time that is time where the channel is used per unit time other than for transmission of the packet.

A server according to an aspect of the present disclosure is a server that transmits a packet by multicast or broadcast via a wireless base station to at least one or more wireless terminals connected to the wireless base station via a wireless network using a channel. The server includes: a generator that generates the packet including the data regarding which the priority has been set beforehand; an acquirer that acquires channel-used time that is time over which the channel is used per unit time at the wireless base station; a first calculator that calculates channel-usable time that is time over which the channel can be used per unit time, for the wireless base station to transmit the packet to the wireless terminal, based on the channel-used time; a second calculator that calculates a channel usage estimated time that is time estimated to be used for the wireless base station to use the channel to transmit the packet to the wireless terminal, and calculates a wireless transmission rate to be applied when the wireless base station transmits the packet to the wireless terminal, based on the priority of the data included in the packet, to where the channel usage estimated time is within the channel-usable time; and a transmitter that transmits the packet, and information indicating the wireless transmission rate, to the wireless base station.

A wireless distribution system according to an aspect of the present disclosure is a wireless distribution system including: a server; a wireless base station connected to the server by a network; and at least one or more wireless terminals connected to the wireless base station via a wireless network using a channel. The server includes a generator that generates the packet including the data regarding which the priority has been set beforehand, an acquirer that acquires channel-used time that is time over which the channel is used per unit time at the wireless base station, a first calculator that calculates channel-usable time that is time over which the channel can be used per unit time, for the wireless base station to use the channel to transmit the packet to the wireless terminal, based on the channel-used time, a second calculator that calculates a channel usage estimated time that is time estimated to be used for the wireless base station to use the channel to transmit the packet to the wireless terminal, and calculates a wireless transmission rate to be applied when the wireless base station transmits the packet to the wireless terminal, based on the priority of the data included in the packet, to where the channel usage estimated time is within the channel-usable time, and a first transmitter that transmits the packet, and information indicating the wireless transmission rate, to the wireless base station. The wireless base station includes a receiver that receives the packet and the information from the server, a decider that decides the wireless transmission rate based on the information, and a second transmitter that transmits the packet by multicast or broadcast to the wireless terminal, at the decided wireless transmission rate.

It should be noted that general or specific embodiments may be implemented as a system, a method, an integrated circuit, a computer program, a storage medium such as a computer-readable CD-ROM, or any selective combination of the system, method, integrated circuit, computer program, and storage medium.

An embodiment will be described in detail below with reference to the drawings. Note that the embodiments described below are all general or specific examples of the present disclosure. Values, shapes, materials, components, arrangement and connection forms of components, steps, orders of steps, and so forth in the following embodiments are only exemplary, and do not restrict the present disclosure. Components in the following embodiments which are not included in an independent Claim indicating the highest concept are described as being optional components.

Embodiment

1. Configuration of Wireless Distribution System

First, the configuration of a wireless distribution system according to an embodiment will be described with reference to FIG. 1. FIG. 1 is a diagram illustrating the configuration of the wireless distribution system according to the embodiment. The wireless distribution system includes a server 12, a wireless base station 13, and multiple wireless terminals 14a and 14b, as illustrated in FIG. 1.

The server 12 is connected to the wireless base station 13 via a wired network 10 (an example of a network). The server 12 transmits multicast packets (an example of a packet) including data regarding which the priority (described later) has been decided beforehand, to the multiple wireless terminals 14a and 14b via the wireless base station 13. Note that the wired network 10 may be configured of one or more routers or one or more switches.

The wireless base station 13 configures a wireless network 11 using a channel. The wireless base station 13 receives a multicast packet from the server 12 and transmits the received multicast packet to the multiple wireless terminals 14a and 14b by multicast. The wireless base station 13 also receives feedback packets from each of the multiple wireless terminals 14a and 14b, and transmits the received feedback packets to the server 12.

The multiple wireless terminals 14a and 14b are each connected to the wireless base station 13 via the wireless network 11. The multiple wireless terminals 14a and 14b each receive multicast packets from the wireless base station 13. The multiple wireless terminals 14a and 14b also each transmit feedback packets, addressed to the server 12, to the wireless base station 13. The server 12 and wireless base station 13 may be realized as a single physical device, with the wired network 10 omitted.

2. Configuration of Wireless Base Station

Figure 2:
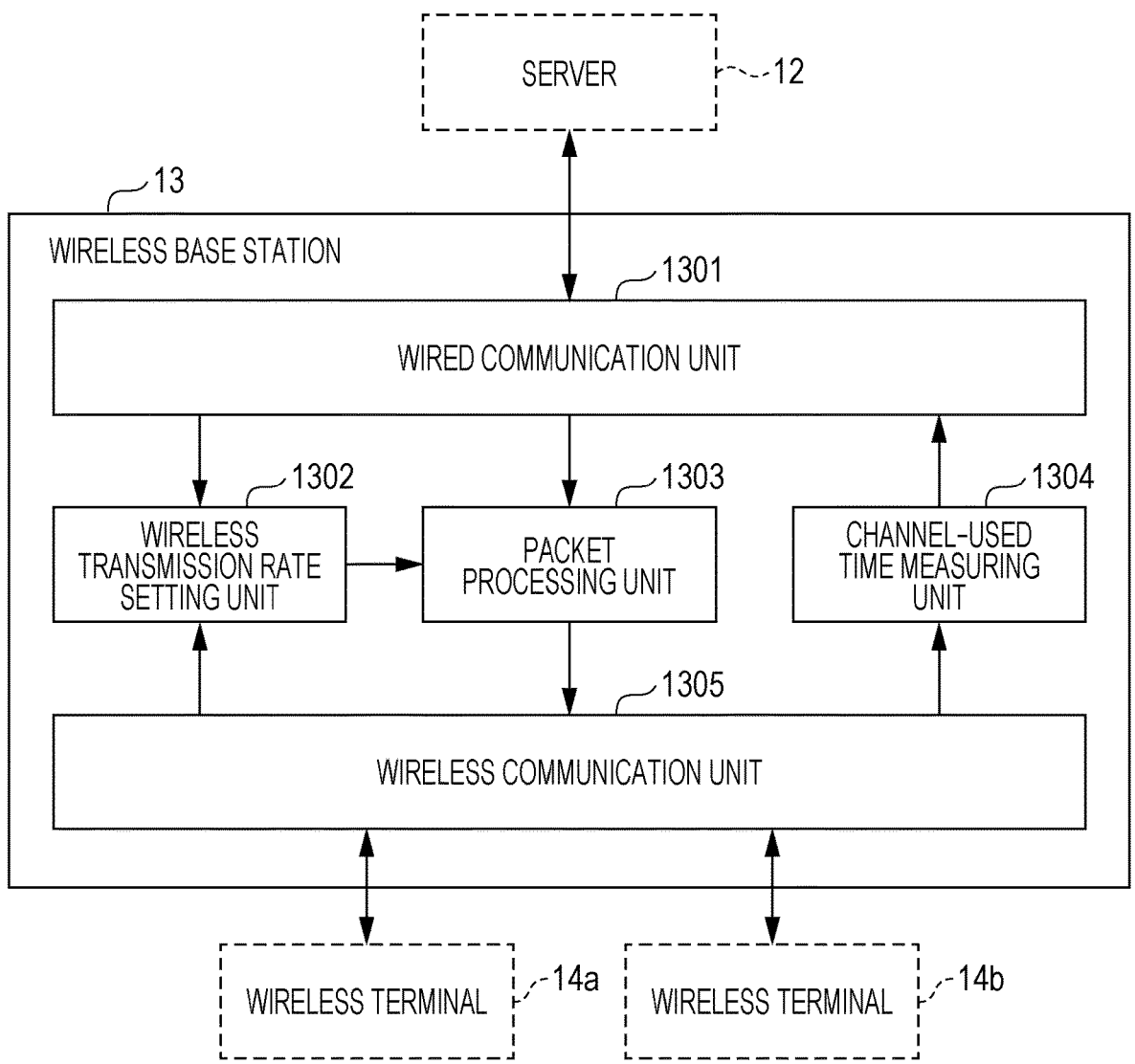
FIG. 2 is a block diagram illustrating the configuration of a wireless base station according to an embodiment.

Next, the configuration of the wireless base station 13 will be described with reference to FIG. 2. FIG. 2 is a block diagram illustrating the configuration of the wireless base station 13 according to the embodiment.

The wireless base station 13 includes a wired communication unit 1301 (an example of a reception unit), a wireless transmission rate setting unit 1302, a packet processing unit 1303 (an example of a deciding unit), a channel-used time measuring unit 1304 (an example of a measuring unit), and a wireless communication unit 1305 (an example of a transmission unit and a second transmission unit), as illustrated in FIG. 2.

The wired communication unit 1301 is connected to the server 12 via the wired network 10. The wired communication unit 1301 receives multicast packets from the server 12. The wired communication unit 1301 also transmits channel-used time (described later), measured by the channel-used time measuring unit, 1304 to the server 12. The wired communication unit 1301 also transmits feedback packets from each of the multiple wireless terminals 14a and 14b to the server 12.

The wireless transmission rate setting unit 1302 correlates identifiers included in multicast packets received by the wired communication unit 1301 with the wireless transmission rate to be applied when transmitting multicast packets on the wireless network 11. Note that this correlation is performed through the wired network 10 or wireless network 11. An identifier is at least one of, for example, (a) Virtual LAN Identifier (VLAN ID) and Priority Code Point (PCP) stipulated by IEEE 802.1Q, that are included in an Ethernet frame, (b) Type Of Service (TOS) included in an IPv4 header, (c) Traffic Class included in an IPv6 header, and (d) Source port No. and Destination port No. included in a User Datagram Protocol (UDP) header.

The wireless transmission rate setting unit 1302 performs correlation of one of the wireless transmission rates of 6, 9, 13, 18, 24, 36, 48, and 54 Mbps, to the identifier of the multicast packet based on the IEEE 802.11a standard, for example. Note that the wireless transmission rate setting unit 1302 may correlate a wireless transmission rate set to a fixed value beforehand, to the identifier of the multicast packet.

The packet processing unit 1303 decides the wireless transmission rate to be correlated by the wireless transmission rate setting unit 1302 when transmitting a multicast packet on the wireless network 11, based on the identifier included in the multicast packet.

The channel-used time measuring unit 1304 measures channel-used time, which is time where a channel is used per unit time (e.g., 100 msec) other than for transmission of multicast packets.

The wireless communication unit 1305 is connected to the multiple wireless terminals 14a and 14b via the wireless network 11. The wireless communication unit 1305 uses the wireless transmission rate decided by the packet processing unit 1303 to transmit a multicast packet to the multiple wireless terminals 14a and 14b by multicast. The wireless communication unit 1305 also receives feedback packets from each of the multiple wireless terminals 14a and 14b.

3. Server Configuration

Figure 3:
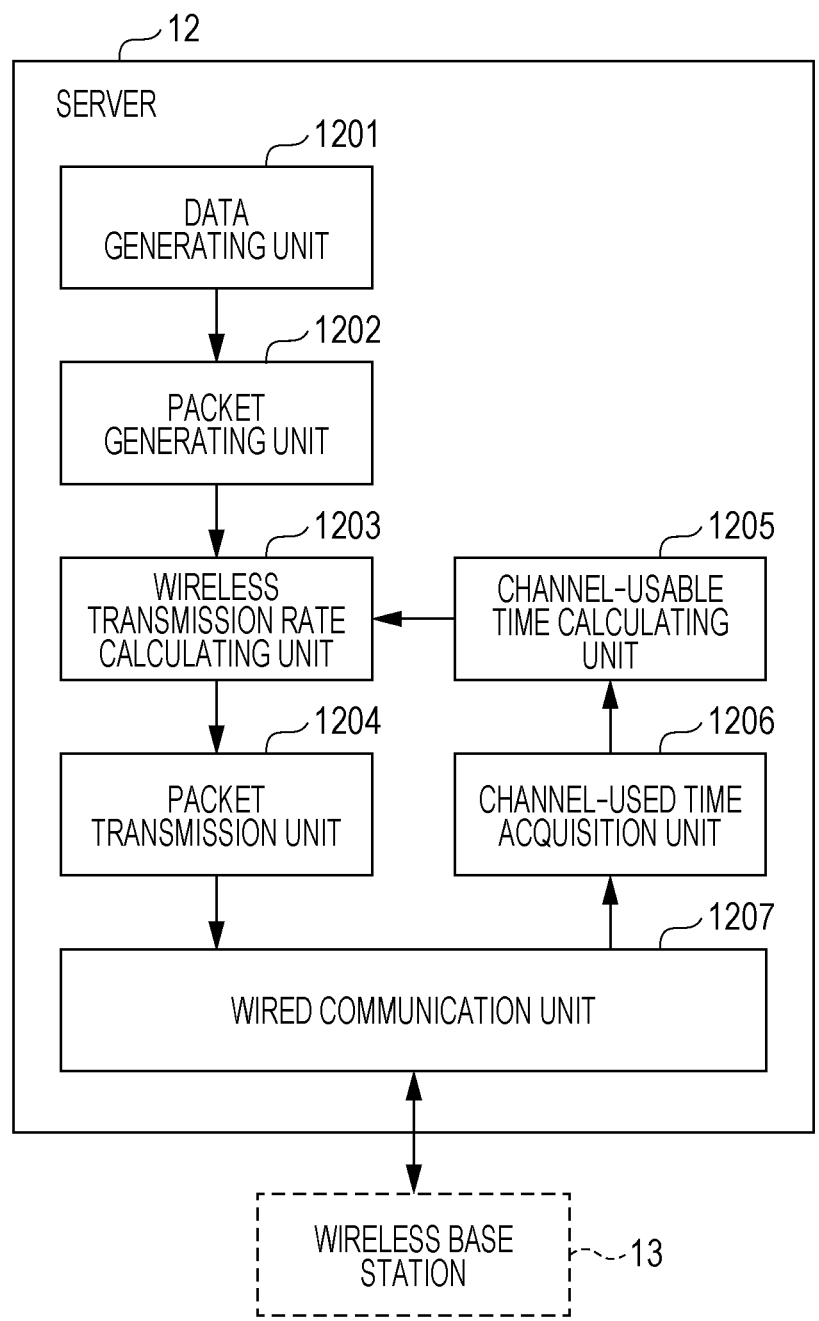
FIG. 3 is a block diagram illustrating the configuration of a server according to an embodiment.

Next, the configuration of the server 12 will be descried with reference to FIGS. 3 and 4. FIG. 3 is a block diagram illustrating the configuration of the server 12 according to the embodiment. FIG. 4 is a diagram illustrating an example of a wireless transmission rate control management table 30.

The server 12 includes a data generating unit 1201, a packet generating unit 1202 (an example of a generating unit), a wireless transmission rate calculating unit 1203 (an example of a second calculating unit), a packet transmission unit 1204, a channel-usable time calculating unit 1205 (an example of a first calculating unit), a channel-used time acquisition unit 1206 (an example of an acquisition unit), and a wired communication unit 1207 (an example of a transmission unit and a first transmission unit), as illustrated in FIG. 3.

The data generating unit 1201 generates data of which the priority has been set beforehand in a fixed manner. Note that priority is information indicating the order of priority in which data is transmitted, and is made up of three stages of "high", "medium", and "low", for example. In a case where the priority set to the data is "high", for example, the order or priority of transmission of this data is highest. In a case where the priority set to the data is "medium", the order or priority of transmission of this data is second highest. In a case where the priority set to the data is "low", the order or priority of transmission of this data is lowest.

The packet generating unit 1202 generates multicast packets including the data generated by the data generating unit 1201. Note that the multicast IP addresses specified by the server 12 as the destination for the multicast packets may all be the same. Accordingly, in a case where the wired network 10 is configured of one or more routers or one or more switches, the number of times and the amount of time regarding configuration of a distribution tree to transmit the multicast packets on the wired network 10 can be reduced as compared to a case of using multiple multicast IP addresses. As a result, the multiple wireless terminals 14a and 14b can promptly receive the multicast packets transmitted by the server 12.

The channel-used time acquisition unit 1206 acquires channel-used time, measured by the channel-used time measuring unit 1304 of the wireless base station 13, from the wireless base station 13.

The channel-usable time calculating unit 1205 calculates the channel-usable time, which is time that the channel can be used per unit for the wireless base station 13 to transmit multicast packets, based on the channel-used time acquired by the channel-used time acquisition unit 1206. Specifically, the channel-usable time calculating unit 1205 calculates the channel-usable time using, for example, the following Expression (1), $$T_{usable} = \alpha \times (T - T_{used}) \qquad \text{Expression (1)}$$

where $T_{usable}$ represents the channel-usable time, $\alpha$ represents a real number that is greater than 0 but no greater than 1, T represents unit time for the wireless base station 13 to measure the channel-used time, and $T_{used}$ represents the channel-used time. Note that the channel-used time may be the average value of the channel-used time measured this time and channel-used time measured in the past.

The wireless transmission rate calculating unit 1203 calculates channel usage estimated time. The channel usage estimated time is estimated time of using the channel for the wireless base station 13 to transmit a multicast packet to the multiple wireless terminals 14a and 14b using a wireless transmission rate. Specifically, the wireless transmission rate calculating unit 1203 calculates the channel usage estimated time based on a standard stipulated in IEEE 802.11a for example, using the following Expressions (2) and (3)

$$T_{est} = N \times (t_{DIFS} + t_{backoff} + t_{PLCP\_preamble} + t_{PLCP\_signal}) + \sum_{n=1}^{N} t_{varible} \qquad \text{Expression (2)}$$

$$t_{variable} = \frac{S_{PLCP\_service} + S_{PSDU} + S_{tail} + S_{padding}}{S_{symble}} \times t_{symble} \qquad \text{Expression (3)}$$

where, in Expression (2), $T_{est}$ represents channel usage estimated time, N represents the number of multicast packets including data to which priority has been set, $t_{DIFS}$ represents a time interval for DCF Inter Frame Space (IFS), $t_{backoff}$ represents an average backoff time interval based on Contention Window, $t_{PLCP\_preamble}$ represents time required for preamble transmission of Physical Layer Convergence Protocol (PLCP) on the wireless network 11, $t_{PLCT\_signal}$ represents time required for transmission of the signal portion of the PLCP header on the wireless network 11, and $t_{varaible}$ represents time required in a case of transmitting bits from the service portion up to the padding of a later-described PLCP header at a wireless transmission rate on the wireless network 11.

Also in Expression (3), $S_{PLCP\_service}$ represents the bit count of the service portion of the PLCP header, $S_{PSDU}$ represents the bit count of a media access control (MAC) protocol data unit (PDU) including multicast packets, $S_{tail}$ represents the bit count of tail bits indicating the end of the frame, $S_{padding}$ represents the bit count of the padding portion, $S_{symble}$ represents the bit count per symbol in a case of transmitting the frame using the wireless transmission rate on the wireless network 11, and $t_{symble}$ represents the amount of time require for transmission of one symbol on the wireless network 11.

The wireless transmission rate calculating unit 1203 calculates a wireless transmission rate to be applied for when transmitting multicast packets, based on the number and size of the multicast packets, and priority of data included in the multicast packet, so that the channel usage estimated time is within the channel-usable time. In a case where the wireless transmission rate to be applied for when transmitting multicast packets cannot be calculated so that the channel usage estimated time is within the channel-usable time, the wireless transmission rate calculating unit 1203 determines whether or not to transmit the multicast packets to the wireless base station 13, based on the priority of data included in the multicast packet.

Further, the wireless transmission rate calculating unit 1203 stores a wireless transmission rate control management table 30 that stores information relating to multicast packets to be transmitted. The wireless transmission rate control management table 30 will be described now with reference to FIG. 4. It can be seen from FIG. 4 that the wireless transmission rate control management table 30 includes a priority column 301, a control object column 302, a transmission object column 303, wireless transmission rate column 304, as illustrated in FIG. 4.

The priority column 301 stores the priority of data included in the multicast packet. In the example illustrated in FIG. 4, information of "high", indicating the highest priority, is stored in the first row of the priority column 301. Information of "medium", indicating second highest priority, is stored in the second row of the priority column 301. information of "low", indicating the lowest priority, is stored in the third row of the priority column 301.

The control object column 302 stores information indicating whether or not the object of changing the wireless transmission rate to be applied when transmitting the multicast packet. In the example illustrated in FIG. 4, the first row of the control object column 302 stores information of "false", indicating that this is not an object of changing the wireless transmission rate to be applied when transmitting the multicast packet. The second and third rows of the control object column 302 store information of "true", indicating that this is an object of changing the wireless transmission rate to be applied when transmitting the multicast packet.

The transmission object column 303 stores information indicating whether or not the object of transmitting the multicast packet. In the example in FIG. 4, the first through third rows of the transmission object column 303 store information of "true", indicating that this is an object of transmission of the multicast packet.

The wireless transmission rate column 304 stores information indicating the wireless transmission rate to be applied when transmitting the multicast packet. In the example illustrated in FIG. 4, the first row of the wireless transmission rate column 304 stores information of "OFDM6 Mbps", indicating that the wireless transmission rate is 6 Mbps. The second row of the wireless transmission rate column 304 stores information of "OFDM12 Mbps", indicating that the wireless transmission rate is 12 Mbps. The third row of the wireless transmission rate column 304 stores information of "OFDM24 Mbps", indicating that the wireless transmission rate is 24 Mbps.

In a case where a multicast packet including data to which a predetermined priority has been set is to be transmitted at a wireless transmission rate initial value set beforehand without fail at the wireless base station 13, this can be realized by setting the control object column 302 to "false" and the wireless transmission rate column 304 to the initial value of the wireless transmission rate.

Returning to FIG. 3, the packet transmission unit 1204 imparts the multicast packet to be transmitted with an identifier corresponding to the wireless transmission rate (an example of information indicating wireless transmission rate), based on the calculation results of the wireless transmission rate calculating unit 1203.

The wired communication unit 1207 is connected to the wireless base station 13 via the wired network 10. The wired communication unit 1207 transmits the multicast packet processed by the packet transmission unit 1204 to the wireless base station 13. The identifier corresponding to the wireless transmission rate has been imparted to the multicast packet at this time, so by transmitting the multicast packet to the wireless base station 13, the wired communication unit 1207 is notifying the wireless base station 13 of the information indicating the wireless transmission rate. The wired communication unit 1207 also receives channel-used time from the wireless base station 13, and outputs the received channel-used time to the channel-used time acquisition unit 1206.

4. Processing by Server

Figure 5:
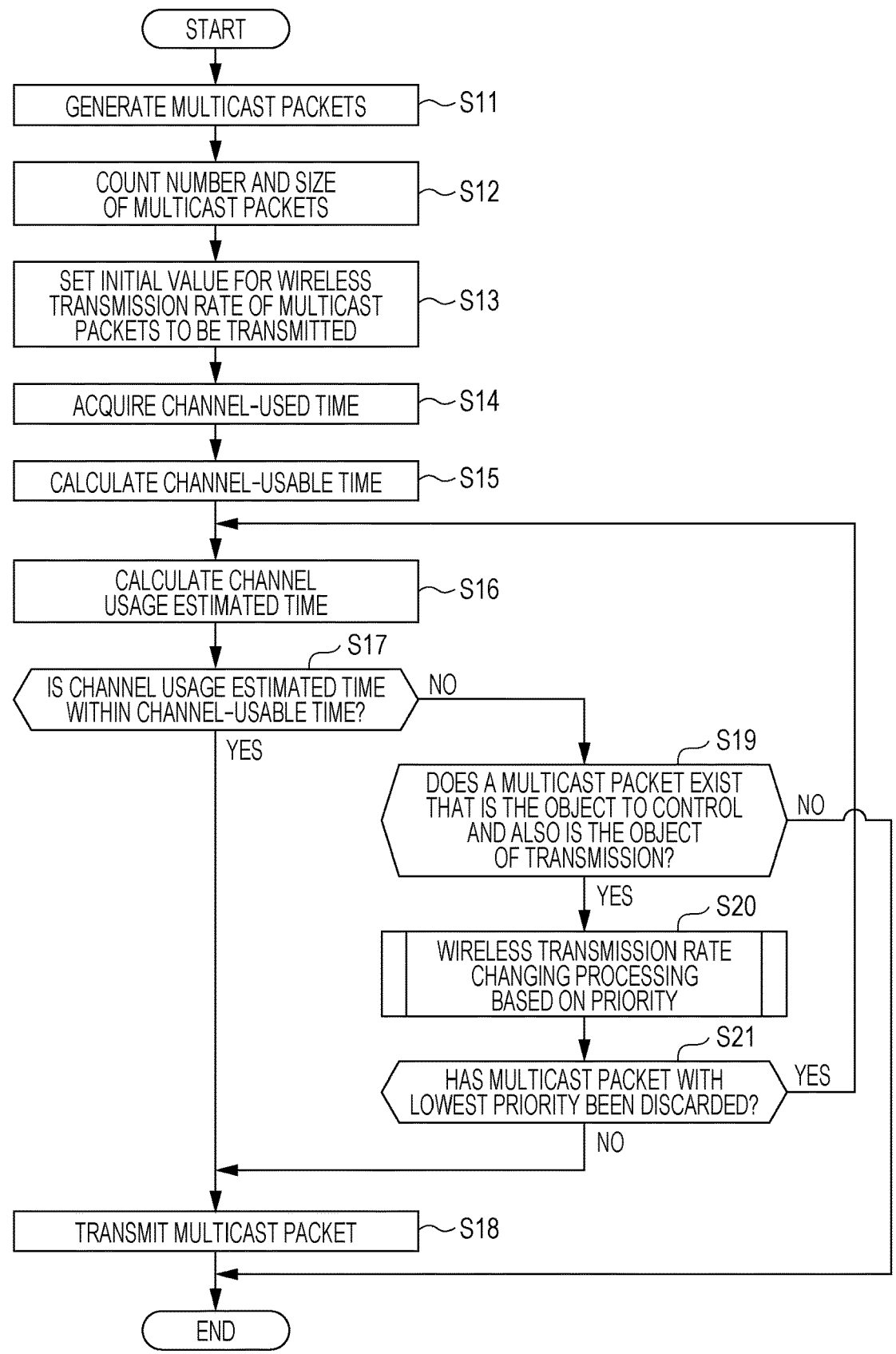
FIG. 5 is a flowchart illustrating processing at a server according to an embodiment.
Figure 6:
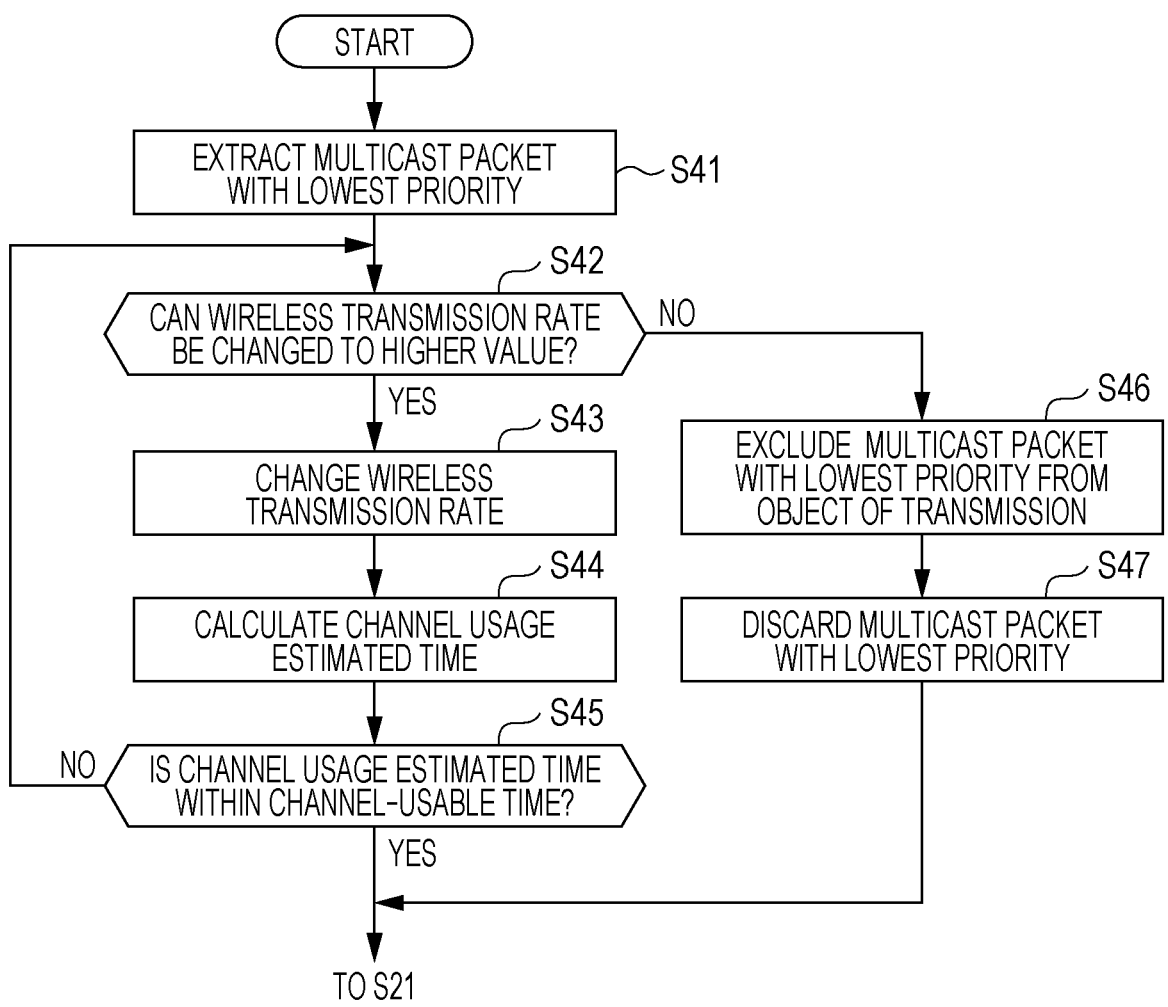
FIG. 6 is a flowchart specifically illustrating wireless transmission rate changing processing in FIG. 5.
Figure 7A:
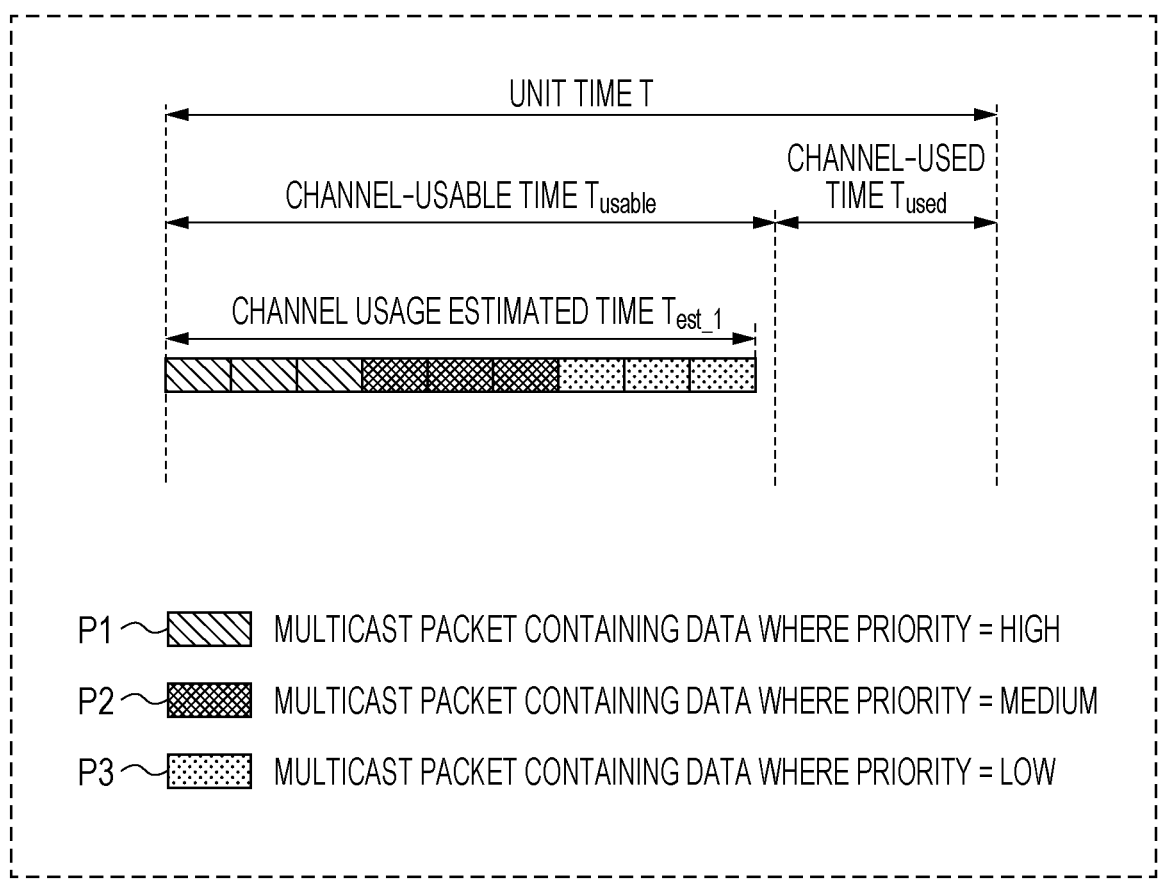
FIG. 7A is a diagram for describing an example of wireless transmission rate changing processing in FIG. 5.
Figure 7B:
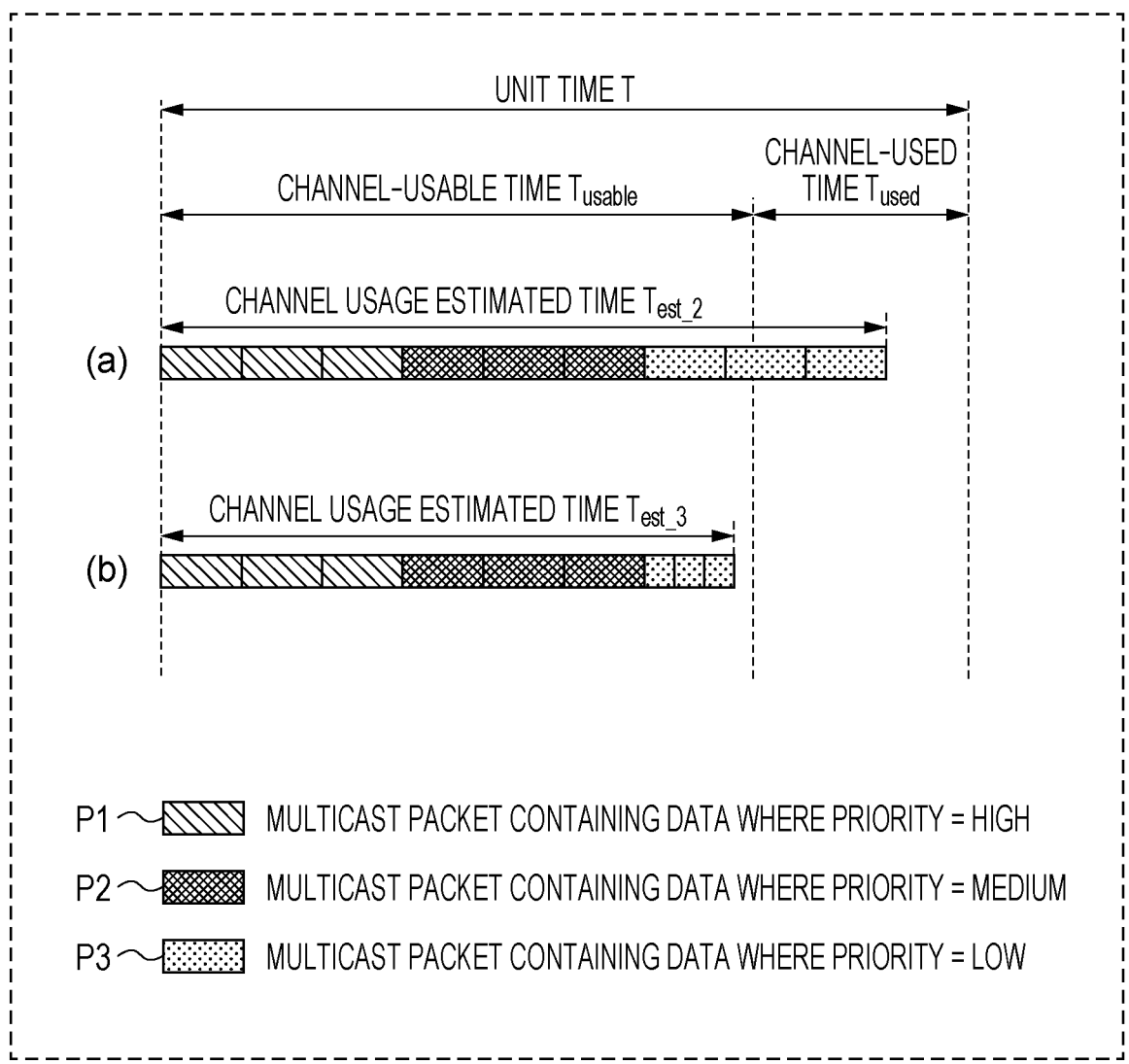
FIG. 7B is a diagram for describing an example of wireless transmission rate changing processing in FIG. 5.
Figure 7C:
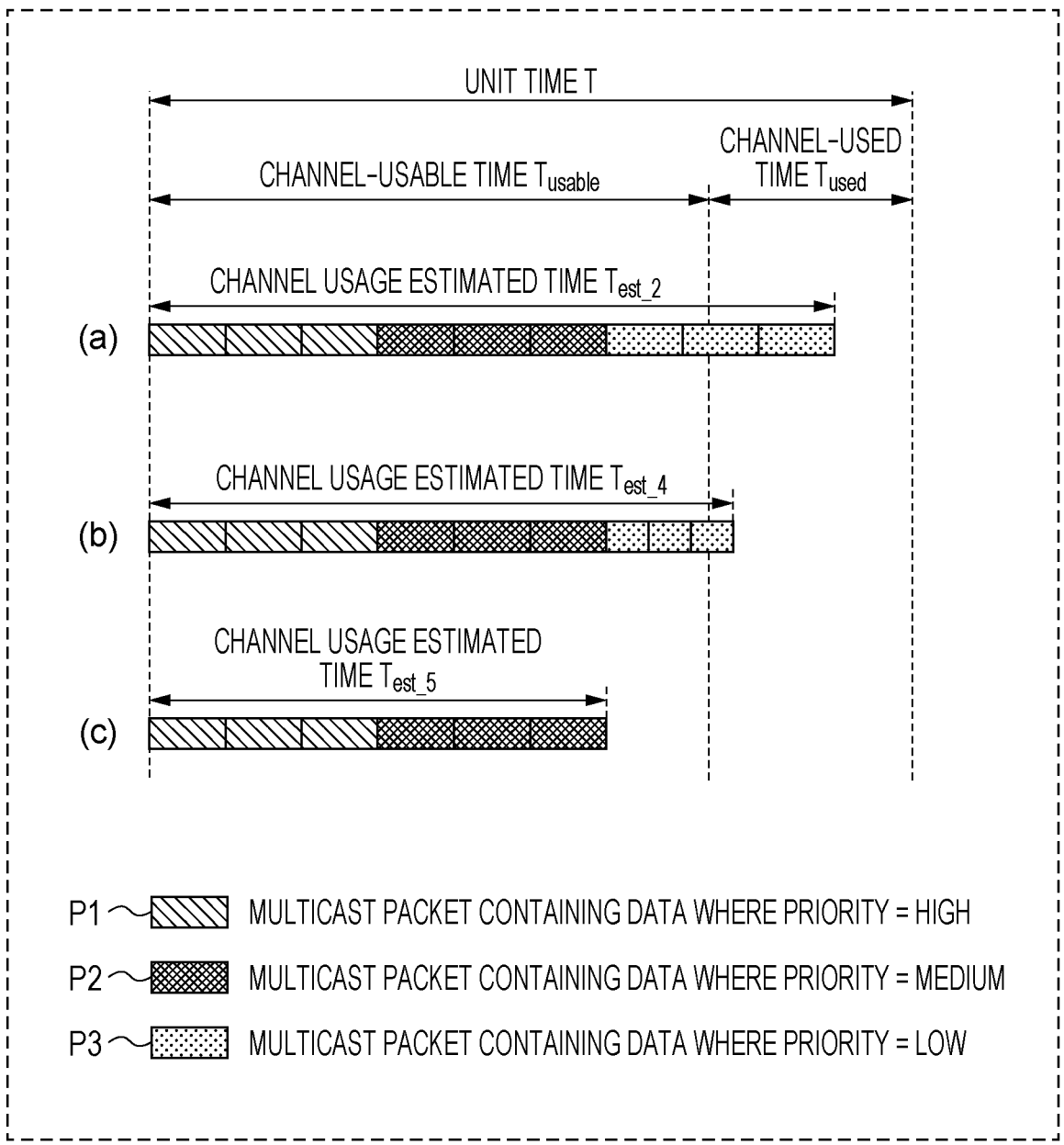
FIG. 7C is a diagram for describing an example of wireless transmission rate changing processing in FIG. 5.

Processing that the server 12 performs in the embodiment will be described with reference to FIGS. 5 through 7C. FIG. 5 is a flowchart illustrating processing performed by the server 12 according to the present embodiment. FIG. 6 is a flowchart illustrating the specifics of processing performed in wireless transmission rate changing processing (S20) in FIG. 5. FIGS. 7A through 7C are diagrams for describing an example of the wireless transmission rate changing processing in FIG. 5. Note that FIGS. 7A through 7C assume that $\alpha=1$ in the above Expression (1), and that the number and size is the same for each of multicast packets P1, P2, and P3, to simplify description.

The packet generating unit 1202 first generates multicast packets containing data generated by the data generating unit 1201 (S11), as illustrated in FIG. 5. Specifically, the priority of data is made up of the three levels of "high", "medium", and "low", and the packet generating unit 1202 generates multicast packets P1 containing data of which the priority is "high", multicast packets P2 containing data of which the priority is "medium", and multicast packets P3 containing data of which the priority is "low", as illustrated in FIGS. 7A through 7C.

The wireless transmission rate calculating unit 1203 counts the number and size of multicast packets for each of the priorities "high", "medium", and "low", of data contained in the multicast packets P1, P2, and P3 generated by the packet generating unit 1202 (S12).

Next, the wireless transmission rate calculating unit 1203 sets initial values R1, R2, and R3, of wireless transmission rate, for each of the priorities "high", "medium", and "low", of data contained in the multicast packets P1, P2, and P3, of which the transmission object column 303 illustrated in FIG. 4 indicates "true" (S13). That is to say, the wireless transmission rate calculating unit 1203 sets the initial value R1 for the wireless transmission rate for the priority "high", the initial value R2 for the wireless transmission rate for the priority "medium", and the initial value R3 for the wireless transmission rate for the priority "low". The initial values R1, R2, and R3 for the wireless transmission rate will all be assumed to be the same values here, for the sake of description.

Next, the channel-used time acquisition unit 1206 acquires the channel-used time $T_{used}$ from the wireless base station 13 (S14). The channel-usable time calculating unit 1205 calculates the channel-usable time $T_{usable}$ based on the channel-used time $T_{used}$ acquired by the channel-used time acquisition unit 1206 (S15).

Next, the wireless transmission rate calculating unit 1203 calculates the channel usage estimated time based on the initial values R1, R2, and R3 for the wireless transmission rate, and number and size of the multicast packets P1, P2, and P3 (an example of first channel usage estimated time) (S16).

Next, the wireless transmission rate calculating unit 1203 determines whether or not the channel usage estimated time is within the channel-usable time $T_{usable}$ (S17). In a case where the wireless transmission rate calculating unit 1203 determines that the channel usage estimated time $T_{est\_1}$ is within the channel-usable time $T_{usable}$ (YES in S17) such as illustrated in FIG. 7A, the initial values R1, R2, and R3 for the wireless transmission rate are maintained without being changed. The packet transmission unit 1204 imparts identifiers corresponding to the initial values R1, R2, and R3 for the wireless transmission rate, to the multicast packets P1, P2, and P3. Accordingly, the wired communication unit 1207 transmits each of the multicast packets P1, P2, and P3 processed by the packet transmission unit 1204 to the wireless base station 13 at the respective initial values R1, R2, and R3 for the wireless transmission rate (S18).

On the other hand, in a case where the wireless transmission rate calculating unit 1203 determines that the channel usage estimated time $T_{est\_2}$ exceeds the channel-usable time $T_{usable}$ (NO in S17) such as indicated by (a) in FIG. 7B and (a) in FIG. 7C, the wireless transmission rate calculating unit 1203 searches the wireless transmission rate control management table 30 and determines whether or not there exists a priority for data contained in the multicast packets P1, P2, and P3, where the control object column 302 and transmission object column 303 both are "true" (S19). That is to say, the wireless transmission rate calculating unit 1203 determines whether or not there exist multicast packets that are the object of control where the wireless transmission rate is changed, and also the object of transmission.

In the examples illustrated in FIGS. 4, 7B, and 7C, the wireless transmission rate calculating unit 1203 determines that there exist multicast packets P2 and P3 that are the object of control and also the object of transmission (YES in S19). In this case, wireless transmission rate changing processing based on the priority is executed (S20). Wireless transmission rate changing processing will be described later in detail.

On the other hand, in a case where the wireless transmission rate calculating unit 1203 determines that there are no multicast packets that are the object of control and also the object of transmission, i.e., that at least one of the control object column 302 and transmission object column 303 give "false" for the priority of data contained in all of the multicast packets P1, P2, and P3 in the wireless transmission rate control management table 30 (NO in S19), the processing ends.

Now, the above-described wireless transmission rate changing processing (S20) will be described in detail with reference to FIG. 6. The wireless transmission rate calculating unit 1203 searches the wireless transmission rate control management table 30 and extracts a multicast packet containing data of which the priority is lowest and where both control object column 302 and transmission object column 303 give "true" (an example of a particular packet) (S41), as illustrated in FIG. 6. In the example illustrated in FIGS. 4, 7B, and 7C, the wireless transmission rate calculating unit 1203 extracts the multicast packet P3 containing data of which the priority is "low".

Next, the wireless transmission rate calculating unit 1203 determines whether or not the initial value R3 of the wireless transmission rate corresponding to the priority "low" of the extracted multicast packet P3 in the wireless transmission rate control management table 30 can be changed to a higher value (S42). In a case of having determined that the initial value R3 of the wireless transmission rate can be changed to a higher value (YES in S42), the wireless transmission rate calculating unit 1203 changes the initial value R3 of the wireless transmission rate to a value R3' (R3<R3') that is higher (S43).

Next, the wireless transmission rate calculating unit 1203 calculates the channel usage estimated time based on the initial values R1, R2, and changed value R3' for the wireless transmission rate, and number and size of the multicast packets P1, P2, and P3 (an example of second channel usage estimated time) (S44). Note that the calculation method for the channel usage estimated time in step S44 is the same as the calculation method for the channel usage estimated time in step S16 described above.

Next, the wireless transmission rate calculating unit 1203 determines whether or not the channel usage estimated time is within the channel-usable time $T_{usable}$ (S45). In a case where the wireless transmission rate calculating unit 1203 determines that the channel usage estimated time $T_{est\_3}$ is within the channel-usable time $T_{usable}$ (YES in S45) as illustrated in FIG. 7B, the flow advances to step S21 in FIG. 5, and determination is made in step S21 regarding whether or not the multicast packet P3 containing data of which the priority is lowest has been discarded.

Returning to FIG. 5, in a case where the wireless transmission rate calculating unit 1203 has determined that the multicast packet P3 containing data of which the priority is lowest has not been discarded (NO in S21), the packet transmission unit 1204 is notified of the initial values R1 and R2 and the changed value R3' of the wireless transmission rate. The packet transmission unit 1204 imparts identifiers corresponding to the initial values R1 and R2 for the wireless transmission rate to the multicast packets P1 and P2, and imparts an identifier corresponding to the changed value R3' for the wireless transmission rate to the multicast packet P3. Thus, the wired communication unit 1207 transmits the multicast packets P1 and P2 to the wireless base station 13 at the respective initial values R1 and R2 for the wireless transmission rate, and transmits the multicast packet P3 to the wireless base station 13 at the changed value R3' for the wireless transmission rate.

Returning to step S45 in FIG. 6, in a case where the wireless transmission rate calculating unit 1203 determines that the channel usage estimated time $T_{est\_4}$ exceeds the channel-usable time $T_{usable}$ (NO in S45) as indicated by (b) in FIG. 7C, the flow returns to step S42. Accordingly, the wireless transmission rate calculating unit 1203 determines whether or not the changed value R3' of the wireless transmission rate corresponding to the priority "low" of the multicast packet P3 can be changed to a higher value (S42). The wireless transmission rate calculating unit 1203 repeatedly executes each process in the above-described steps S42 through S45 until the channel usage estimated time is within the channel-usable time $T_{usable}$.

On the other hand, in a case where determination is made that the initial value R3 or changed value R3' of the wireless transmission rate corresponding to the priority "low" of the multicast packet P3 cannot be changed to a higher value (NO in S42), the wireless transmission rate calculating unit 1203 excludes the multicast packet P3 containing the data of which the priority is the lowest from the objects of transmission (S46), as indicated by (c) in FIG. 7C. Specifically, the wireless transmission rate calculating unit 1203 changes the transmission object column 303 corresponding to the priority "low" in the wireless transmission rate control management table 30 from "true" to "false". A conceivable example of a case where the initial value R3 or changed value R3' of the wireless transmission rate corresponding to the priority "low" of the multicast packet P3 cannot be changed to a higher value is a case where the initial value R3 or changed value R3' of the wireless transmission rate is 54 Mbps, which is the upper limit value in the IEEE 802.11a standard. The wireless transmission rate calculating unit 1203 discards the multicast packet P3 containing the data of which the priority is the lowest, which has been excluded from the object of transmission (S47), and the flow advances to step S21 in FIG. 5.

Returning to FIG. 5, in a case where the wireless transmission rate calculating unit 1203 determines that the multicast packet P3 containing the data of which the priority is the lowest has been discarded in step S20 (YES in S21), the flow returns to step S16, where the channel usage estimated time $T_{est\_5}$ is calculated based on the initial values R1 and R2 for the wireless transmission rate, and number and size of the multicast packets P1 and P2 (S16). In a case where the channel usage estimated time $T_{est\_5}$ is within the channel-usable time $T_{usable}$ as indicated by (c) in FIG. 7C (YES in S17), the packet transmission unit 1204 imparts identifiers corresponding to the initial values R1 and R2 for the wireless transmission rate as to the multicast packets P1 and P2. Accordingly, the wired communication unit 1207 transmits the multicast packets P1 and P2 to the wireless base station 13 at the respective initial values R1 and R2 for the wireless transmission rate (S18).

Note that in a case where the channel usage estimated time $T_{est\_5}$ exceeds the channel-usable time $T_{usable}$ (NO in FIG. 17), the processes in the above-described steps S16, S17, S20, and S21 are repeatedly executed until the channel usage estimated time is within the channel-usable time $T_{usable}$.

5. Advantages

As described above, the server 12 controls the wireless transmission rate based on the priority of data included in the multicast packets, so that the channel usage estimated time is within the channel-usable time. For example, in a case where the channel-usable time is relatively short, a faster wireless transmission rate is used when the wireless base station 13 transmits, on the wireless network 11, packets including data of which the priority is low, thereby reducing the channel usage estimated time, and as a result, data can be transmitted in real-time. The server 12 decides the priority of data based on information relating to each of the wireless terminals 14*a* and 14*b*, and accordingly can transmit data suitable for each of the wireless terminals 14*a* and 14*b* with priority.

Other Embodiments

While a communication method and so forth according to one or multiple aspects have been described by way of the above embodiment, the present disclosure is not restricted to the above embodiment. Various modifications to the embodiment and combinations of components of different embodiments which are conceivable by one skilled in the art may be encompassed by one or multiple aspects without departing from the essence of the present disclosure.

Although description has been made in the embodiment above regarding a case where the server 12 transmits multicast packets to multiple wireless terminals 14*a* and 14*b* by multicast, this is not restrictive. For example, broadcast packets (an example of a packet) may be transmitted to multiple wireless terminals 14*a* and 14*b* by broadcast.

Although description has been made in the embodiment above regarding a case where the wireless distribution system has two wireless terminals 14*a* and 14*b*, this is not restrictive. For example, the number of wireless terminals that the wireless distribution system has may be one, or three or more.

Although description has been made in the embodiment above regarding a configuration where priority is in the three levels of "high", "medium", and "low", this not restrictive. For example, priority may be in two levels, or four or more levels.

Note that the components of the above embodiments may be realized by dedicated hardware, or may be realized by a software program suitable for the components being executed. The components may be realized by a program executing unit such as a CPU or another processor or the like reading out and executing the software program recorded in a recording medium such as a hard disk, semiconductor memory, or the like. Software realizing the server and so forth in the above embodiments is a program such as follows.

That is to say, the program causes a computer to execute generating the packet including the data regarding which the priority has been set beforehand; acquiring of channel-used time that is time over which the channel is used per unit time at the wireless base station; calculating of channel-usable time that is time over which the channel can be used per unit time, for the wireless base station to transmit the packet to the wireless terminal, based on the channel-used time; calculating of a first channel usage estimated time that is time estimated to be used for the wireless base station to use the channel to transmit the packet to the wireless terminal; calculating of a wireless transmission rate to be applied when the wireless base station transmits the packet to the wireless terminal, based on the priority of the data included in the packet, to where the first channel usage estimated time is within the channel-usable time; and transmitting of the packet, and information indicating the wireless transmission rate, to the wireless base station.

Part or all of the components of which the above-described devices are configured may be configured as an IC card detachably mountable to each device, or a standalone module. The IC card or the module is a computer system configured including a microprocessor, ROM, RAM, and so forth. The IC card or the module may include a super-multifunctional LSI. The IC card or the module achieves its functions by the microprocessor operating according to the computer program. The IC card or the module may be tamper-resistant.

The present disclosure may in one form be the above-described method, may be a computer program which realizes these methods by a computer, or may be digital signals made up of the computer program. The present disclosure may in one form be the computer program or the digital signals recorded in a computer-readable recording medium, such as for example, a flexible disk, hard disk, CD-ROM, MO, DVD, DVD-ROM, DVD-RAM, BD (Blu-ray (a registered trademark) Disc), semiconductor memory, or the like. The present disclosure may also be the digital signals recorded in these recording mediums. The present disclosure may in one form be an arrangement where the computer program or the digital signals are transmitted over an electric communication line, wireless or wired communication line, a network of which the Internet is representative, data broadcasting, or the like. The present disclosure may in one form be a computer system having a microprocessor and memory, where the memory stores the computer program, and the microprocessor operates according to the computer program. This may also be carried out by another independent computer system, by the program or digital signals being recorded in the recording medium and being transported, or by the program or digital signals being transported over the network or the like.

The communication method, wireless base station, server, and wireless distribution system according to the present disclosure are useful in a system or the like that distributes in real-time dynamic maps to a self-driving vehicle for example, indicating traffic states and the like.

What is claimed is:

1. A communication method of a server that transmits a packet by multicast or broadcast via a wireless base station to at least one or more wireless terminals connected to the wireless base station via a wireless network using a channel, the method comprising:
   generating, via a processor, the packet including priority data indicating a priority has been set beforehand, the priority data of the packet indicating a first priority;
   acquiring, via the processor, channel-used time that is time over which the channel is used per unit time at the wireless base station;
   calculating, via the processor, channel-usable time that is time over which the channel is available to be used per unit time, for the wireless base station to transmit the packet to the wireless terminal, based on the channel-used time;
   calculating, via the processor, a first channel usage estimated time that is time estimated to be used for the wireless base station to use the channel to transmit the packet to the wireless terminal;
   calculating, via the processor, a wireless transmission rate to be applied when the wireless base station transmits the packet to the wireless terminal, based on the priority indicated by the priority data included in the packet, to where the first channel usage estimated time is within the channel-usable time;
   transmitting, via a transmitter, the packet, and information indicating the wireless transmission rate, to the wireless base station; and
   transmitting, via the wireless base station, the packet to the wireless terminal in accordance with the calculated wireless transmission rate,
   wherein another packet including different priority data indicating a second priority different from the first priority is transmitted at a different wireless transmission rate.

2. The communication method according to claim 1, further comprising:
   setting, via the processor, an initial value for the wireless transmission rate,
   wherein, in the calculating of the wireless transmission rate, the initial value of the wireless transmission rate is changed based on a priority indicated by priority data included in a particular packet, in a case where the first channel usage estimated time exceeds the channel-usable time.

3. The communication method according to claim 2,
   wherein, in the generating, a plurality of packets are generated, each packet among the plurality of packets including priority data indicating different priority from other packets,
   wherein, in the calculating of the first channel usage estimated time, the first channel usage estimated time is calculated by estimating time of the wireless base station using the channel to transmit the plurality of packets to the wireless terminal,
   and wherein, in the calculating of the wireless transmission rate, in a case where the first channel usage estimated time exceeds the channel-usable time, the particular packet including the priority data of which the priority is lowest is extracted from the plurality of packets, and the initial value for the wireless transmission rate corresponding to the particular packet is changed to a higher value.

4. The communication method according to claim 2, further comprising:
   calculating, via the processor and after changing the wireless transmission rate in the calculating of the wireless transmission rate, a second channel usage estimated time that is estimated time of the wireless base station using the channel to transmit the plurality of packets including the particular packet to the wireless terminal; and
   determining, via the processor, whether or not to transmit the particular packet to the wireless base station in a case where the second channel usage estimated time exceeds the channel-usable time.

5. The communication method according to claim 4, further comprising:
   discarding, by the processor, the particular packet in a case of having determined not to transmit the particular packet to the wireless base station in the determining.

6. The communication method according to claim 1,
   wherein, in the transmitting, an identifier indicating the wireless transmission rate is imparted to the packet.

7. A wireless base station connected to a server via a network, and connected to at least one or more wireless terminals via a wireless network using a channel, the wireless base station comprising:
   a receiver that receives a packet from the server, the packet including priority data indicating a first priority;
   a processor that determines a wireless transmission rate to be applied for the received packet when transmitting the received packet to the wireless terminal based on the priority data of the packet, different wireless transmission rates being applied to different packets of different priorities;
   a transmitter that transmits the packet by multicast or broadcast to the wireless terminal at the wireless transmission rate; and
   a measurer that measures a channel-used time at the wireless base station, the channel-used time being time where the channel is used per unit time at the wireless base station other than for transmission of the packet,
   wherein the wireless transmission rate to be applied to the packet is based on the priority data included in the packet and the measured channel-used time, and
   wherein another packet including priority data indicating a second priority different from the first priority is transmitted at a different wireless transmission rate.

8. A server that transmits a packet by multicast or broadcast via a wireless base station to at least one or more wireless terminals connected to the wireless base station via a wireless network using a channel, the server comprising:
   a generator that generates the packet including priority data indicating a priority has been set beforehand, the priority data of the packet indicating a first priority;
   an acquirer that acquires channel-used time that is time over which the channel is used per unit time at the wireless base station;
   a first calculator that calculates channel-usable time that is time over which the channel is available to be used per unit time, for the wireless base station to transmit the packet to the wireless terminal, based on the channel-used time;

a second calculator that calculates a channel usage estimated time that is time estimated to be used for the wireless base station to use the channel to transmit the packet to the wireless terminal, and calculates a wireless transmission rate to be applied when the wireless base station transmits the packet to the wireless terminal, based on the priority indicated by the priority data included in the packet, to where the channel usage estimated time is within the channel-usable time; and a transmitter that transmits the packet, and information indicating the wireless transmission rate, to the wireless base station, wherein the information indicating the wireless transmission rate causes the wireless base station to transmit the packet to the wireless terminal in accordance with the calculated wireless transmission rate, and wherein another packet including priority data indicating a second priority different from the first priority is transmitted at a different wireless transmission rate.

9. A wireless distribution system comprising:

a server;

a wireless base station connected to the server by a network; and at least one or more wireless terminals connected to the wireless base station via a wireless network using a channel wherein the server includes a generator that generates the packet including priority data indicating a priority has been set beforehand, the priority data of the packet indicating a first priority, an acquirer that acquires channel-used time that is time over which the channel is used per unit time at the wireless base station, a first calculator that calculates channel-usable time that is time over which the channel is available to be used per unit time, for the wireless base station to use the channel to transmit the packet to the wireless terminal, based on the channel-used time, a second calculator that calculates a channel usage estimated time that is time estimated to be used for the wireless base station to use the channel to transmit the packet to the wireless terminal, and calculates a wireless transmission rate to be applied when the wireless base station transmits the packet to the wireless terminal, based on the priority indicated by the priority data included in the packet, to where the channel usage estimated time is within the channel-usable time, and a first transmitter that transmits the packet, and information indicating the wireless transmission rate, to the wireless base station, and wherein the wireless base station includes a receiver that receives the packet and the information from the server, a processor that determines the wireless transmission rate based on the information indicating the wireless transmission rate, and a second transmitter that transmits the packet by multicast or broadcast to the wireless terminal, at the determined wireless transmission rate, wherein another packet including priority data indicating a second priority different from the first priority is transmitted at a different wireless transmission rate.

* * * * *